(12) United States Patent
Uesaka

(10) Patent No.: US 8,967,016 B2
(45) Date of Patent: Mar. 3, 2015

(54) STEERING COLUMN APPARATUS

(71) Applicant: Fuji Kiko Co., Ltd., Kosai-shi (JP)

(72) Inventor: Yota Uesaka, Toyohashi (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 0 days.

(21) Appl. No.: 14/288,988

(22) Filed: May 28, 2014

(65) Prior Publication Data

US 2014/0352481 A1 Dec. 4, 2014

(51) Int. Cl.
 *B62D 1/181* (2006.01)
(52) U.S. Cl.
 CPC ...................................... *B62D 1/181* (2013.01)
 USPC ............................................ 74/493; 280/775
(58) Field of Classification Search
 CPC .......... B62D 1/181; B62D 1/18; B62D 1/185; B62D 1/19
 USPC .............................. 280/775, 777; 74/493, 492
 See application file for complete search history.

(56) References Cited

U.S. PATENT DOCUMENTS

| | | | | |
|---|---|---|---|---|
| 5,178,411 | A | * | 1/1993 | Fevre et al. ..................... 280/775 |
| 5,911,789 | A | * | 6/1999 | Keipert et al. .................. 74/493 |
| 7,410,190 | B2 | * | 8/2008 | Sawada et al. ................ 280/777 |
| 8,650,982 | B2 | | 2/2014 | Matsuno et al. |
| 2008/0047382 | A1 | | 2/2008 | Tomaru et al. |
| 2008/0079253 | A1 | * | 4/2008 | Sekii et al. ..................... 280/775 |
| 2009/0100956 | A1 | * | 4/2009 | Warashina ....................... 74/493 |
| 2009/0256341 | A1 | * | 10/2009 | Okada et al. ................... 280/775 |
| 2011/0239809 | A1 | * | 10/2011 | Beneker et al. ................. 74/493 |
| 2011/0314954 | A1 | * | 12/2011 | Matsuno et al. ................ 74/493 |
| 2012/0247259 | A1 | * | 10/2012 | Mizuno et al. .................. 74/493 |
| 2013/0160597 | A1 | * | 6/2013 | Masuda et al. .................. 74/493 |

FOREIGN PATENT DOCUMENTS

| | | |
|---|---|---|
| EP | 2 402 232 A1 | 1/2012 |
| JP | 2011-121440 A | 6/2011 |
| JP | 2012-11786 A | 1/2012 |

OTHER PUBLICATIONS

European Search Report dated Oct. 30, 2014, 7 pgs.

\* cited by examiner

*Primary Examiner* — Drew Brown
(74) *Attorney, Agent, or Firm* — Foley & Lardner LLP

(57) ABSTRACT

A supporting unit of a telescopic adjustment mechanism is placed within an opening hole formed at one end side of an outer jacket and fixed to an outer peripheral surface of an inner jacket. A tip of a screw axle which is movable in an axial direction of a jacket is linked to the supporting unit. The inner jacket placed at an inside of an outer jacket is pressed on an inner peripheral surface of outer jacket by means of a biasing mechanism placed at an opposite side of the opening hole. Thus, positions of the supporting unit and the biasing mechanism along the axial direction of the jacket are substantially coincident with each other and the supporting unit is placed within the outer jacket in the axial direction of the jacket. Consequently, a steering column apparatus can be small-sized in the axial direction of the jacket.

5 Claims, 11 Drawing Sheets

STEERING COLUMN APPARATUS

BACKGROUND OF THE INVENTION (1) Field of the Invention

The present invention relates to a steering column apparatus which is capable of performing a telescopic operation for a steering wheel by means of an electrically driven motor.

(2) Description of Related Art

A steering apparatus having a telescopic mechanism by which a forward-or-backward position of a steering wheel is adjustable using a driving force of the electrically driven motor is well known.

For example, a Japanese Patent Application First Publication (tokkai) No. 2012-11786 published on Jan. 19, 2012 exemplifies a previously proposed steering column apparatus.

The previously proposed steering column apparatus includes: a jacket having a cylindrical outer jacket to an inside of which an inner jacket is relatively movably connected; and a telescopic adjustment mechanism which is modifiable a projection quantity of the inner jacket from the outer jacket with the electrically driven motor as a driving source.

The telescopic adjustment mechanism described in the above-described previously proposed steering column apparatus includes an axle member enabled to be movable in a forward-or-backward direction along an axial direction of the jacket with the electrically driven motor as the driving source, one end of this shaft member being linked to a base member projected in a radial direction from the outer peripheral surface of the inner jacket so as to modify a projection quantity of the inner jacket from the outer jacket.

SUMMARY OF THE INVENTION

Incidentally, in recent years, an improvement in a degree of freedom of layout and expansion of a vehicular compartment space are demanded and small sizing of a vehicular steering column apparatus is demanded.

However, in the above-described previously proposed steering column apparatus, there is a room of further improvement to make a small sizing of the whole apparatus.

It is an object of the present invention to provide an improved steering column apparatus which can meet the demand of small-sizing of the whole apparatus.

According to one aspect of the present invention, there is provided a steering column apparatus, comprising: a jacket including a cylindrical inner jacket and a cylindrical outer jacket, the cylindrical inner jacket being inserted through an inside of the cylindrical outer jacket; an arc shaped member which is formed by bending a thin plate material, the arc shaped member being interposed between the cylindrical outer jacket and the cylindrical inner jacket; a steering shaft rotatably supported on the jacket, the steering shaft having one end linked to a steering wheel and the other end linked to a steerable gear side; a telescopic adjustment mechanism with an electrically driven motor as a driving source, the telescopic adjustment mechanism being adjustable a forward-or-backward position of the steering wheel by modifying a projection quantity of the cylindrical inner jacket projected from one end side of the cylindrical outer jacket; and a biasing mechanism configured to press an outer peripheral surface of the cylindrical inner jacket on an inner peripheral surface of the cylindrical outer jacket via the arc shaped member, wherein a rectangular opening hole having a pair of elongated side sections along an axial direction of the jacket is formed on one end side of the outer jacket, the biasing mechanism comprises a pressing member disposed along the axial direction of the outer jacket at an opposite side of a circumferential direction of the opening hole and biased to project from the inner peripheral surface of the outer jacket toward a radial direction of the outer jacket, the telescopic adjustment mechanism comprises: a supporting unit placed within the opening hole and fixed to the outer peripheral surface of the inner jacket; and an axle member movably supported on the outer jacket along the axial direction of the jacket and having a tip linked to the supporting unit, and the inner jacket is always biased toward the opening hole side by means of a biasing force of the pressing member and is supported via the arc shaped member at both side sections of the opening hole in the inner peripheral surface of the outer jacket placed along the pair of elongated side sections.

In the structure in which the opening hole is formed on the outer jacket and the inner jacket is biased by means of the biasing mechanism (biasing means) from the opposite side of the opening hole, the inner jacket is supported at two supporting points provided at both sides of the opening hole and placed at the pair of elongated side sections of the opening hole as viewed from the axial direction of the jacket.

In a case where, as viewed from the axial direction of the jacket, a biasing direction of the biasing mechanism is deviated toward one of the pair of elongated side sections with respect to an opening center of the opening hole, a tip position of the arc shaped member placed at the one of the pair of elongated side sections is, preferably, set to be more remote from the opening hole than a tip position of the arc shaped member placed at the other of the pair of elongated side sections and a position at which the inner jacket is supported at one of the pair of the elongated side sections is, preferably, more remote from the opening hole than another position at which the inner jacket is supported at the other of the pair of the elongated side sections.

In addition, in a case where, as viewed from the axial direction of the jacket, a biasing direction of the biasing mechanism is deviated toward one of the pair of elongated side sections with respect to an opening center of the opening hole, an inner diameter of a part of an inner peripheral surface of the outer jacket adjacent to the one of the pair of elongated side sections is, preferably, made relatively large and a position of the one of the pair of elongated side sections at which the inner jacket is supported is, preferably, more remote from the opening hole than a position of the other of the pair of elongated side sections at which the inner jacket is supported.

Furthermore, the arc shaped member is made of steel, the outer jacket is a casting product, and the inner jacket is a cylindrical (pipe) member made of steel.

DETAILED DESCRIPTION OF THE INVENTION

Figure 1:
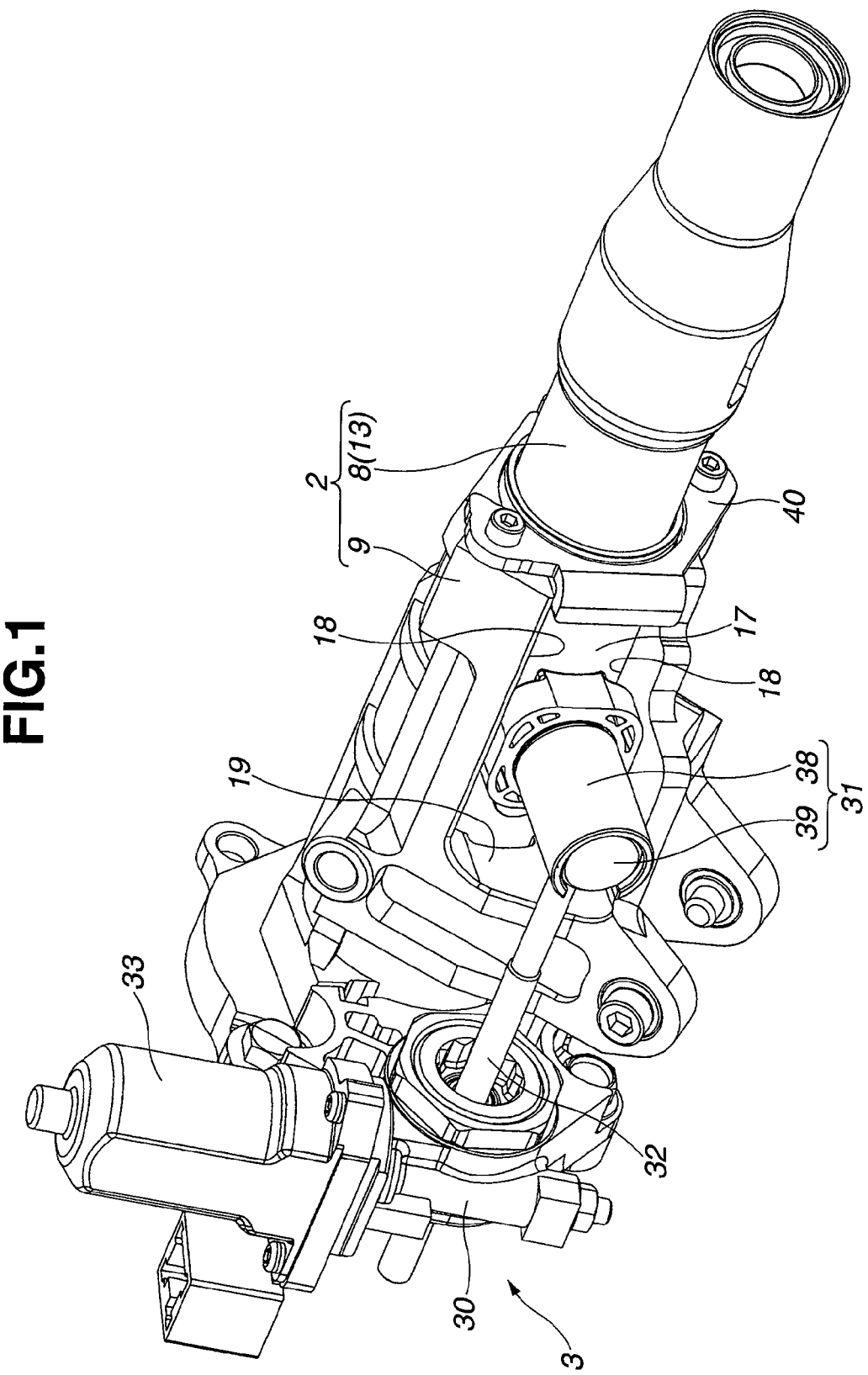
FIG. 1 is a perspective view of a steering column apparatus related to a first preferred embodiment according to the present invention.
Figure 2:
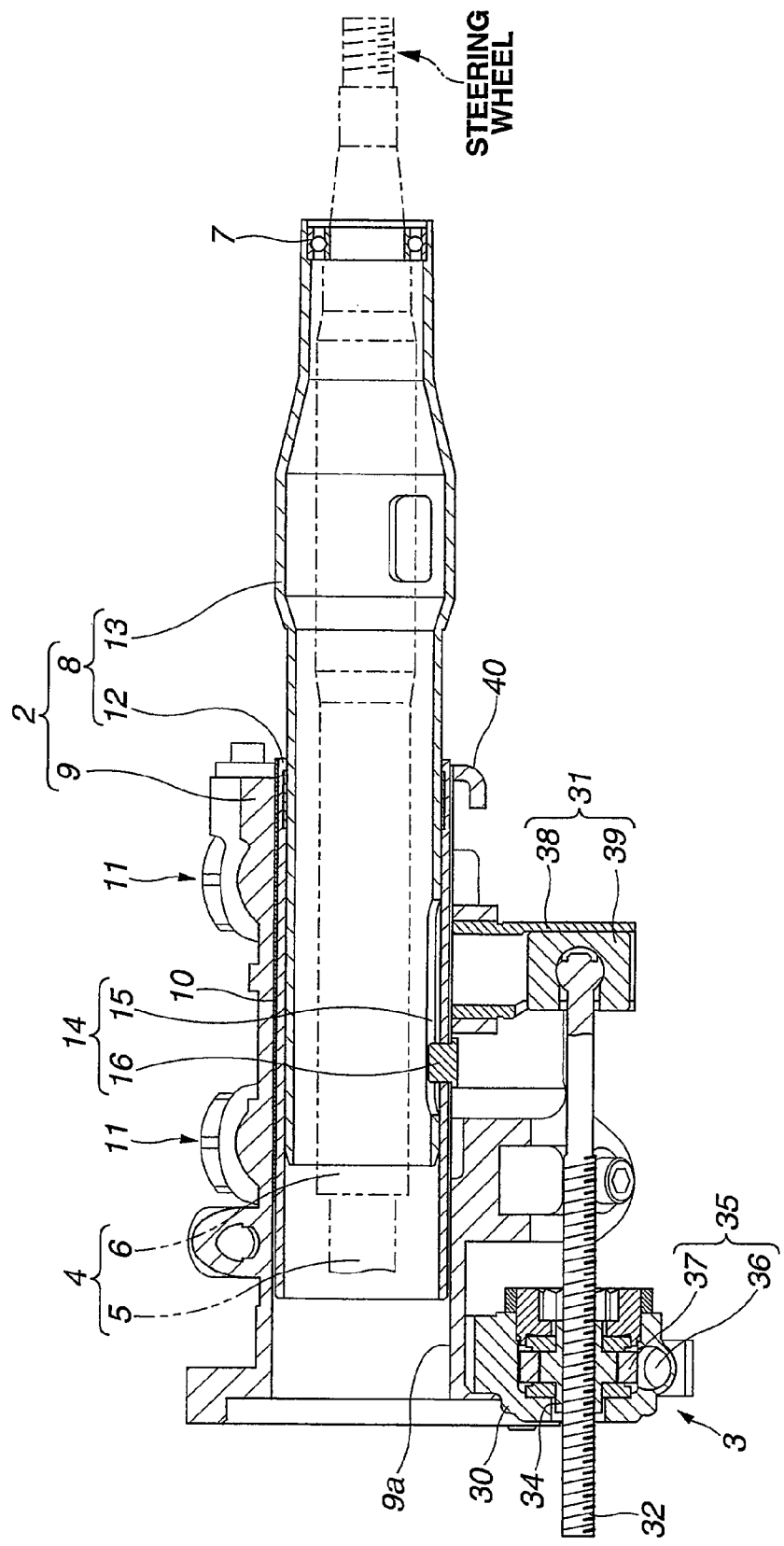
FIG. 2 is an axially cross sectional view of the steering column apparatus related to the first embodiment according to the present invention.
Figure 3:
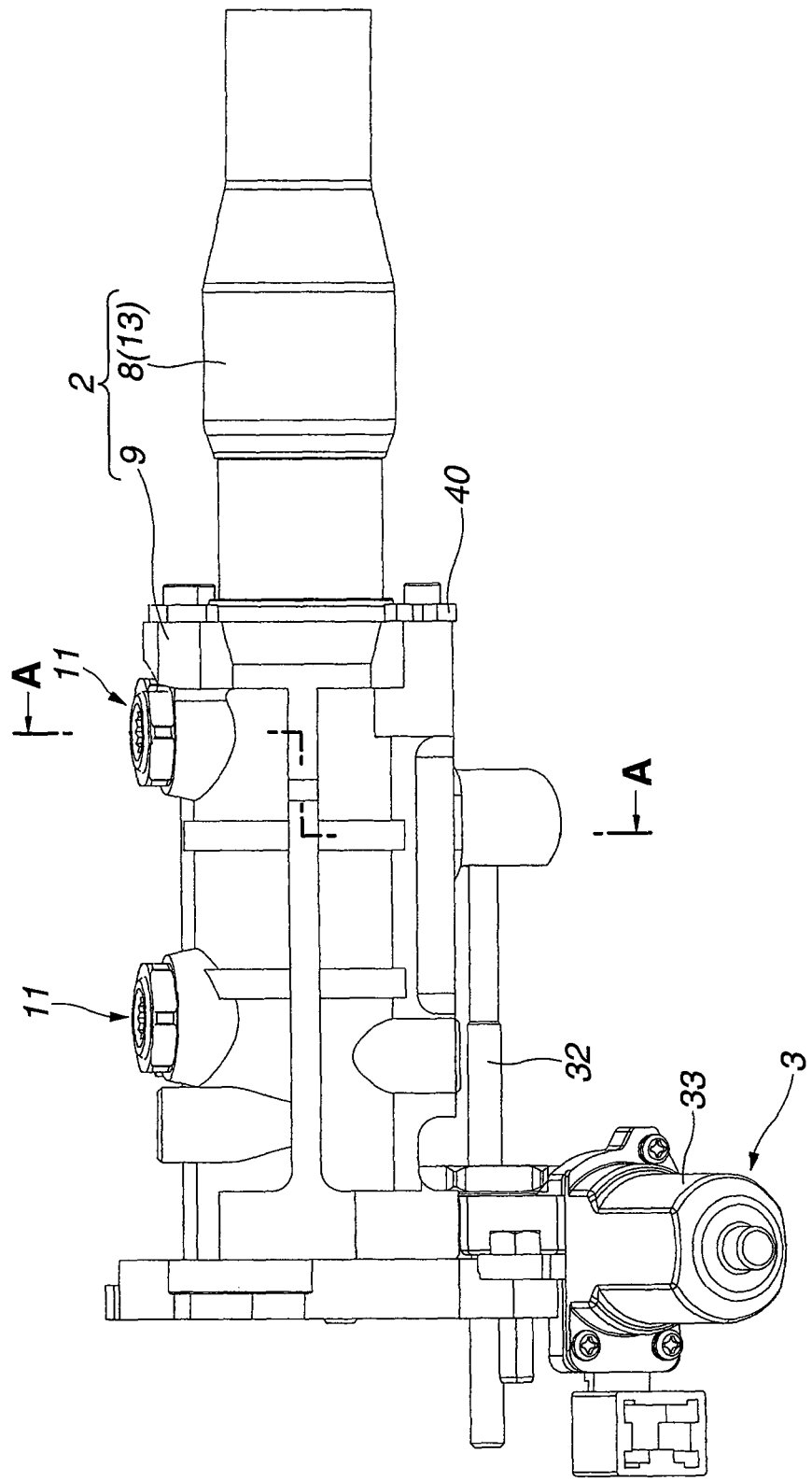
FIG. 3 is a side view of the steering column apparatus related to the first embodiment according to the present invention.
Figure 4:
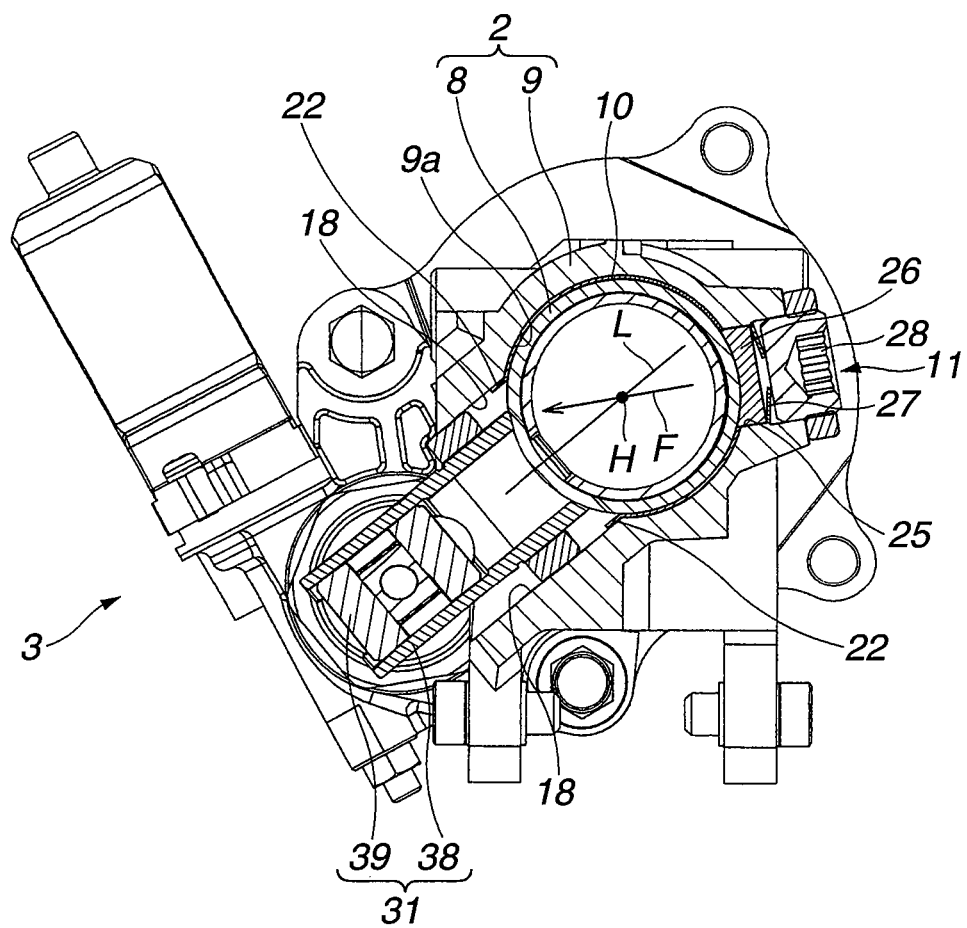
FIG. 4 is a cross sectional view of the steering column apparatus cut away along a line A to A in FIG. 3.
Figure 5:
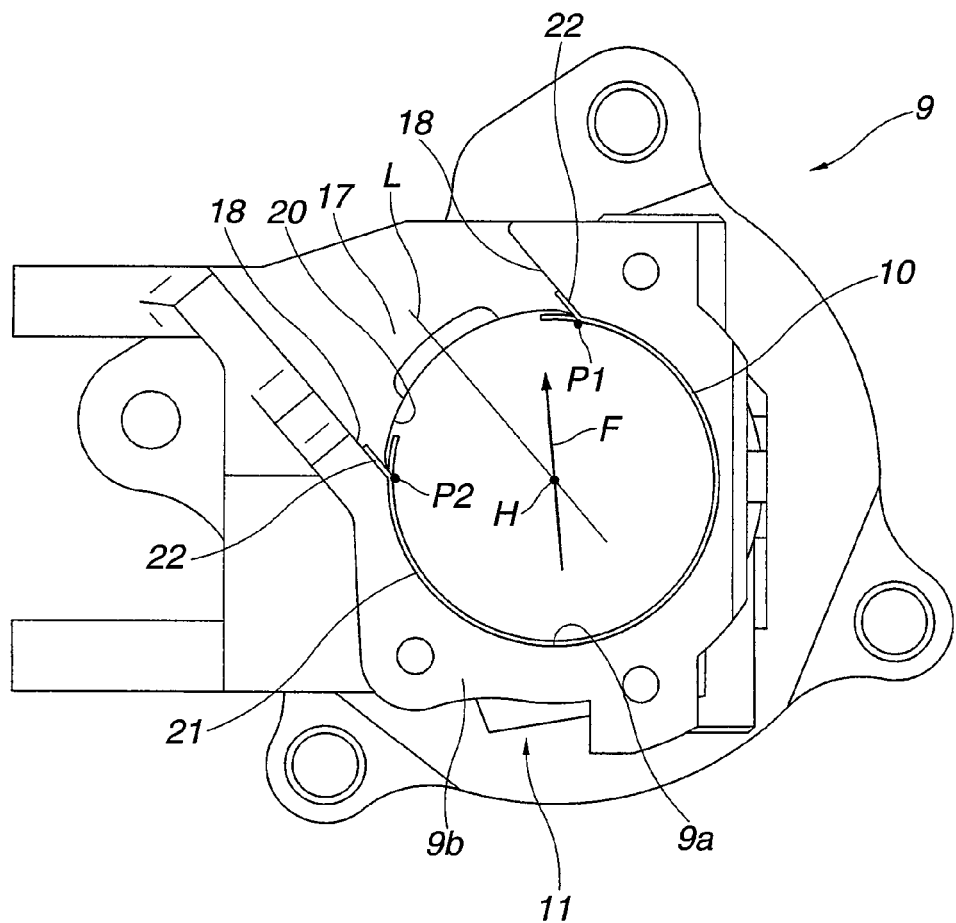
FIG. 5 is an elevation view of an outer jacket in the first preferred embodiment of the steering column apparatus according to the present invention.
Figure 6:
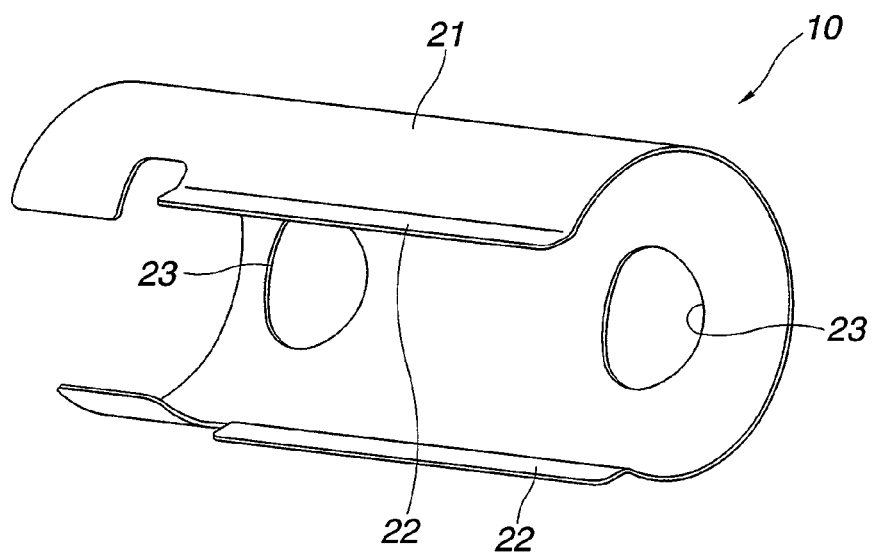
FIG. 6 is a perspective view of a retainer in the first preferred embodiment of the steering column apparatus.

Hereinafter, a steering column apparatus in a first preferred embodiment, in a second preferred embodiment, in a third preferred embodiment, in a fourth preferred embodiment, and in a fifth preferred embodiment will be described below with reference to the drawings. FIG. 1 through FIG. 6 show explanatory views representing a rough structure of a steering column apparatus according to the present invention. FIG. 1 is a perspective view, FIG. 2 is an axially cross sectioned view, FIG. 3 is a side view, FIG. 4 is a cross sectional view cut away along a line A to A in FIG. 3. In addition, FIG. 5 shows the elevation view representing a rough structure of an outer jacket 9 in the first preferred embodiment. FIG. 6 is a perspective view of a retainer 10 in the first embodiment according to the present invention.

As shown in FIGS. 1 and 2, the steering column apparatus is roughly constituted by a cylindrical jacket 2 rotatably supporting a steering shaft 4 (refer to FIG. 2) and a telescopic adjustment mechanism 3.

Steering shaft 4 includes a lower shaft 5 located at a steerable gear side and an upper shaft 6 linked to a steering wheel. As shown in FIG. 2, both of upper shaft 5 and lower shaft 6 are connected together relatively movably in an axial direction of steering shaft 4 in a state in which a relative rotation between lower shaft 5 and upper shaft 6 is limited. Steering shaft 4 is rotatably supported on jacket 2 via a bearing 7.

Jacket 2, as shown in FIGS. 1 through 3, includes: cylindrical inner jacket 8 and cylindrical outer jacket 9; an arc shaped member having an arc shaped cross section, viz., a retainer 10 interposed between inner jacket 8 and outer jacket 9; and a biasing mechanism 11 as biasing means for pressing the outer peripheral surface of inner jacket 8 on an inner peripheral surface 9a of outer jacket 9.

Inner jacket 8, as shown in FIG. 2, includes a cylindrical lower inner jacket 12 and a cylindrical upper inner jacket 13. Inner jacket 8 is disposed at an inside of outer jacket 9. Upper inner jacket 13 is press fitted (forcibly inserted) into lower jacket 12. In an ordinary state, both of upper inner jacket 13 and lower inner jacket 12 are united together and are movable along an axial direction of jacket 2 (8,9) by means of telescopic adjustment mechanism 3. It should be noted that a stopper mechanism 14 is provided in jacket 2, as shown in FIG. 2. Stopper mechanism 14 serves as a limitation of a movement quantity when upper inner jacket 13 is moved in the axial direction thereof at a time of a secondary collision and, in an ordinary state, serves as a rotation stop mechanism of upper inner jacket 13. Stopper mechanism 14 is structured in such a way that an elongated hole 15 is formed on upper inner jacket 13 along the jacket axial direction and a projection 16 projected from lower inner jacket 12 side is engaged on this elongated hole 15.

Outer jacket 9 is a casting product made of, for example, an aluminum alloy. As shown in FIGS. 1 through 3, an opening hole 17 is formed on one end side of outer jacket 9 along an axial direction of outer jacket 9. Opening hole 17 has an elongated rectangular shape along the axial direction of jacket 2 (8, 9).

This opening hole 17 has a pair of elongated side sections 18, 18 along the axial direction of jacket 2 (8, 9).

It should be noted that opening hole 17 has one end side in the axial direction of jacket 2 (8, 9) continued to one end surface 9b of outer jacket 9. As a whole, part of one end surface 9b of outer jacket 9 is cut out along the axial direction of jacket 2 (8, 9). In addition, the other end side of opening hole 17 in the axial direction of jacket 2 (8, 9) provides a short side section 19 orthogonal to elongated side sections 18, 18.

Inner peripheral surface 9a of outer jacket 9 basically provides a cylindrical surface of the same radius. A recess section 20 is formed at a part of inner peripheral surface 9a of outer jacket 9 which is relatively large and is the same position as short side section 19 as viewed from the axial direction of jacket 2 (8, 9). This recess section 20 is formed in a predetermined range along the axial direction of jacket 2 (8, 9) with short side section 19 as a start point.

Retainer 10 which is the arc shaped member is substantially letter C shaped member. Retainer 10 is made through a bending process for a rectangular plate-like shaped member made of a steel.

Retainer 10, as shown in FIGS. 5 and 6, includes: a main frame section 21 which provides a substantially letter C shape having a constant curvature; and a pair of bent sections 22, 22 bent toward an outer peripheral side from main frame section 21.

Two penetrating holes 23 are penetrated through main frame section 21 in order for a pressing member 26 as will be described later to be pressed against inner jacket 8. Main frame section 21 is fitted and fixed to inner peripheral surface 9a of outer jacket 9 at a position at which opening hole 17 is formed in the axial direction of jacket 2 (8, 9).

Pair of bent sections 22, 22 are engaged with elongated side sections 18, 18 of opening hole 17 to limit a relative rotation between retainer 10 and outer jacket 9.

Inner jacket 8 is slidably disposed against retainer 10 described above (refer to FIG. 4). A fluorine resin molding is carried out on an inner peripheral surface of retainer 10 so as to improve a slidability with inner jacket 8.

As shown in FIGS. 4 and 5, biasing mechanism 11 is disposed at an opposite side to opening hole 17 as viewed from the axial direction of jacket 2 (8, 9). That is to say, biasing mechanism 11 is disposed so as to oppose against opening hole 17. A biasing direction of biasing mechanism 11 (arrow mark F) is deviated toward one of pair of elongated side sections 18 side with respect to an opening center (straight line L) as viewed from the axial direction of jacket 2 (8, 9). It should be noted that H shown in FIGS. 4 and 5 denotes a center of inner diameter of outer jacket 9.

Biasing mechanism 11 is, as shown in FIG. 4, serves to press inner jacket 8 on inner peripheral surface 9a of outer jacket 9 through pressing member 26 inserted through a penetrating hole 25 on outer jacket 9 so as to prevent a backlash (or clearance) to be developed between inner jacket 8 and outer jacket 9. Pressing member 26 is tightened in a radial direction of jacket 2 (8, 9) by means of a tightening nut 28 via a dish spring 27. Tightening nut 28 is screwed with a screw section formed on the inner peripheral surface of penetrating hole 25.

Telescopic adjustment mechanism 3, as shown in FIGS. 1 and 2, generally includes: a housing 30 fixed to an outer peripheral surface of outer jacket 9; a supporting unit 31 projected toward a radius direction of inner jacket 8; a screw axle 32 (which serves as an axle member) supported within housing 30 so as to be movable along the axial direction of jacket 2 (8, 9); and an electrically driven motor 33 which provides a driving source when screw axle 32 is reciprocated along the axial direction of jacket 2 (8, 9).

Housing 30 rotatably supports a telescopic nut 34 screwed to a rear end side of screw axle 32 and houses and holds a worm gear 35 which rotatably drives telescopic nut 34. Worm gear 35 includes: a worm 36 rotationally driven through electrically driven motor 33; and an annular worm wheel 37 having an outer peripheral side screwed to worm 36. Worm wheel 37 is engaged with telescopic nut 34 and both of worm wheel 37 and telescopic nut 34 are rotated together in a unit.

Supporting unit 31 includes: a supporting housing 38 fixed onto the outer peripheral surface of inner jacket 8; and a supporting member 39 which is housed and held within support housing 38 and to which a tip of screw axle 32 is swingably linked.

In addition, supporting unit 31 is placed within opening hole 17 when inner jacket 8 is assembled to outer jacket 9 and is set to be moved in a range in which the position of supporting unit 31 is approximately coincident with the biasing mechanism 11 along the axial direction of jacket 2 (8, 9). A male screw is formed on the outer peripheral surface of screw axle 32 at the rear end side of screw axle 32 and screw axle 32 is screwed to telescopic nut 34. Electrically driven motor 33 is fixed with respect to housing 30.

In this telescopic adjustment mechanism 3, worm wheel 37 and telescopic nut 34 are rotated together with the rotation of worm 36 when electrically driven motor 33 is rotated. However, since worm wheel 37 and telescopic nut 34 are rotatably held on housing 30, screw axle 32 is moved along the axial direction of jacket 2 (8, 9) accompanied by the rotation of telescopic nut 34.

In other words, when electrically driven motor 33 is rotated, supporting unit 31 is moved along with the axial direction of jacket 2 (8, 9) together with inner jacket 8. Thus, a projection quantity of inner jacket 8 projected from one end side of outer jacket 9 is modified so that a forward-and-rearward position of the steering wheel (not shown) is adjusted.

It should be noted that a reference numeral of 40 shown in FIGS. 1 through 3 denotes a lid member to be attached onto an end surface 9b of one end side of outer jacket 9.

In the steering column apparatus in the first embodiment as described above, the positions of supporting unit 31 and biasing mechanism 11 along the axial direction of jacket 2 (8, 9) are approximately coincident with each other so that supporting unit 31 is not positioned at an outside (toward the steering gear side) of outer jacket 9 in the axial direction of jacket 2 (8, 9). Hence, a length of jacket 2 along the axial direction of jacket 2 can relatively be shortened and, as a whole, the steering column apparatus can be relatively be small sized in the jacket axial direction (axial direction of jacket 2 (8, 9)).

It should be noted that, if opening hole 17 is provided on outer jacket 9 and inner jacket 8 is biased from an opposite side to the position at which opening hole 17 is disposed without intervention of retainer 10 between the outer peripheral surface of inner jacket 8 and inner peripheral surface 9a of outer jacket 9, inner jacket 8 is supported at a position of an inner peripheral surface 9a of outer jacket 9 which provides an opening edge of opening hole 17. In addition, in a case where retainer 10 is interposed between inner jacket 8 and outer jacket 9, inner jacket 8 is supported at a tip position of the retainer if the tip of the retainer is placed at an outside of opening hole 17 and inner jacket 8 is supported at a position of the elongated side section 18 of opening hole 17 if the tip of the retainer is placed within the inside of opening hole 17.

In the first embodiment, pair of elongated side sections 18, 18 are covered by retainer 10. Hence, inner jacket 8 is supported on retainer 10 at points P1 and P2 (refer to FIG. 5) which are positions in the circumferential direction of the jacket and providing elongated side sections 18, 18.

A recess section 20 is formed in outer jacket 9. Hence, inner jacket 8 is supported by means of the retainer at a position having an opening edge of recess section 20 in the circumferential direction of the jacket. Then, due to a presence of this recess section 20, inner jacket 8 is not supported along the short side section 19 of opening hole 17.

Therefore, without providing a step difference on the inner peripheral surface of outer jacket 9, supporting points P1, P2 positioned along pair of elongated side sections 18, 18 and biasing mechanism positioned at the opposite side of opening hole 17 can assuredly support inner jacket 9 and the backlash (or clearance) between the outer jacket 9 and inner jacket 8 can assuredly be prevented from being developed.

An abrasion during the relative movement of inner jacket 8 with respect to outer jacket 9 is prevented by means of retainer 10 and catch and abrasion between outer jacket 9 and inner jacket 8 can be prevented from being developed. Hence, the slidability during the telescopic adjustment by means of telescopic adjustment mechanism 3 can be improved.

Hereinafter, preferred embodiments other than the first preferred embodiment will be described. However, the same reference numerals as those of the first embodiment designate corresponding elements and duplicate explanations of these elements in the other embodiments will herein be omitted.

Second Embodiment

Figure 7:
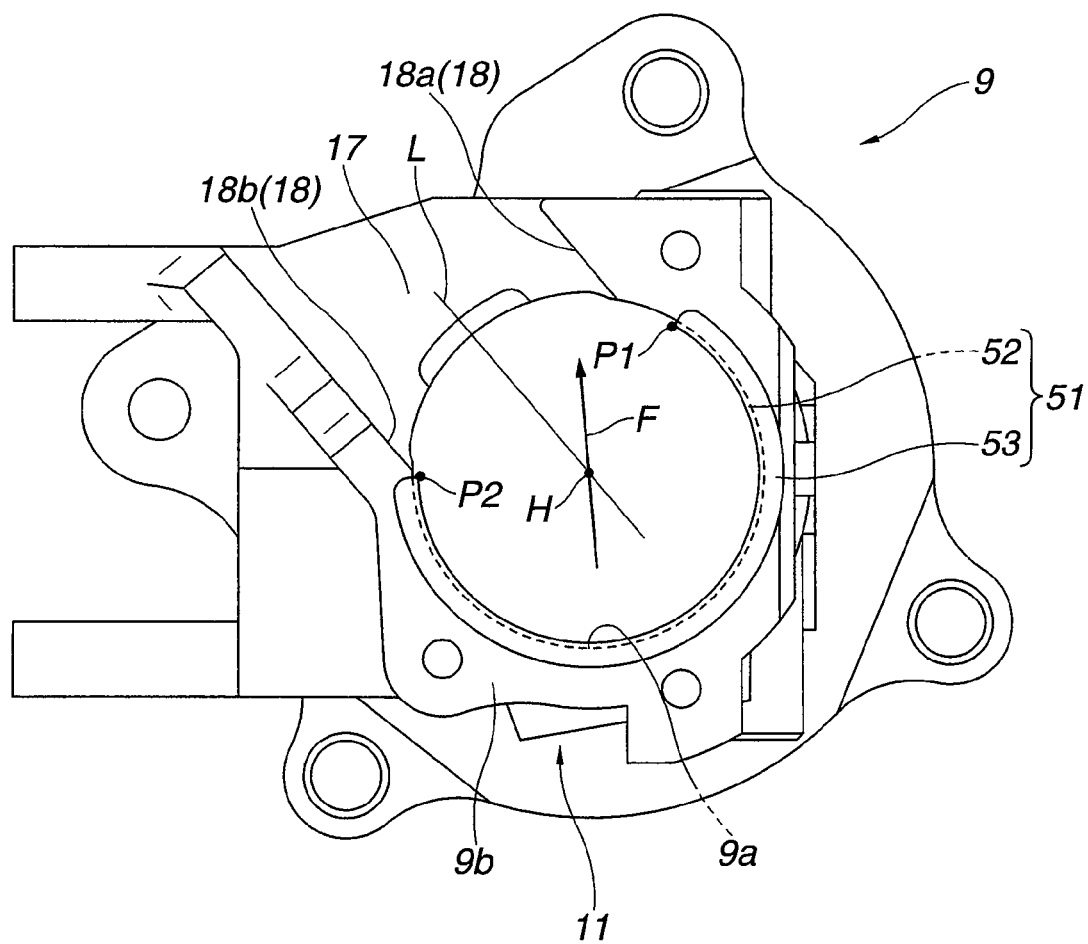
FIG. 7 is an elevation view of an outer jacket in a second preferred embodiment of the steering column apparatus according to the present invention.

The steering column apparatus in a second preferred embodiment will be described using FIG. 7. FIG. 7 shows an elevation view representing a rough structure of outer jacket 9 in the second embodiment according to the present invention.

The steering column apparatus in the second embodiment has substantially the same structure as that of the steering column apparatus in the first embodiment. However, in a case where, in the second embodiment, as viewed from the axial direction of jacket 2 (8, 9), with respect to an opening center of opening hole 17 (namely, a straight line L), the biasing direction (arrow mark F) by means of biasing mechanism 11 is deviated toward one elongated side section 18a of opening hole 17, from among supporting points P1, P2 at which inner jacket 8 is supported along pair of elongated side sections 18a, 18b of opening hole 17, one supporting point P1 at the one side of elongated side section 18a is set to become far away from one elongated side section 18a.

That is to say, in the second embodiment, as viewed from the axial direction of jacket 2 (8, 9), a tip position of a retainer 51 placed at the one elongated side section 18a is set to become more remote from opening hole 17 than the tip position of retainer 51 placed at the other elongated side section 18b so that a position (supporting point P1) at which inner jacket 8 is supported on one elongated side section 18a is made more remote from opening hole 17 than a position (supporting point P2) at which inertia jacket 8 is supported Retainer 51 in this embodiment is formed in a substantially letter C shape by carrying out a bending process for a steel made rectangular plate-like member. Retainer 51 includes: a main frame section 52 of an arc shape having a constant curvature; and a flange shaped bending section 53 formed on one end side of main fame section 52. Main frame section 52 is fitted and fixed onto inner peripheral surface 9a of outer jacket 9. Bending section 53 is engaged with one end surface 9b of outer jacket 9. Bending section 53 is grasped between one end surface 9b of outer jacket 9 and lid member 40 to limit the movement of retainer 51 along the axial direction of jacket 2 (8, 9).

In addition, in the second embodiment, pressing member 26 presses inner jacket 8 under pressure via retainer 51. However, in the same way as the first embodiment, a penetrating hole through which pressing member 26 is penetrated may be disposed. It should be noted that a fluororesin coating is carried out on the inner peripheral surface of retainer 51 so that a slidablity between retainer 51 and inner jacket 8 are improved.

Inner jacket 8 is supported by means of two supporting points P1, P2 positioned along pair of elongated side sections 18a, 18b as viewed from the axial direction of jacket 2 (8, 9). Inner jacket 8 is slid with respect to retainer 51 through these supporting points P1, P2. However, when a biasing force by means of biasing mechanism 11 is concentrated on one of these two supporting points P1, P2, a reaction force of one of these two supporting points P1, P2 to which the biasing force is concentrated becomes relatively large.

For example, in a case where the opening center (straight line L) of opening hole 17 and the biasing direction by means of biasing mechanism 11 are not coincident with each other, inner jacket 8 is tried to be supported on a position of elongated side sections 18a, 18b in a circumferential direction of jacket 2 (8, 9). At this time, since a balance of the reaction forces at these supporting points is lost, one of elongated side sections 18a, 18b to which the biasing force by means of biasing mechanism 11 is concentrated becomes easy to be worn down.

Therefore, in a case where the biasing direction by means of biasing mechanism 11 is deviated toward one of elongated side sections 18a with respect to the opening center of opening hole 17, as viewed from the axial direction of jacket 2 (8, 9), the tip position of retainer 51 placed at the position of one elongated side section 18a is set to be more remote from opening hole 17 than the tip position of retainer placed at the other elongated side 18b.

Thus, even in a case where the opening center of opening hole 17 is not coincident with the biasing direction by means of biasing mechanism 11, the reaction force balance at each of supporting points P1, P2 can be improved. Then, an uneven abrasion of inner jacket 8 at one of supporting points P1, P2 can be suppressed.

Therefore, it becomes possible for retainer 51 to appropriately modify the position at which inner jacket 8 is supported. Hence, a special machining for outer jacket 9 is not needed to be carried out and an inexpensive suppression of the uneven abrasion can be achieved.

In addition, even if the biasing direction by means of biasing mechanism 11 is deviated toward one of elongated side sections 18a of opening hole 17, retainer 51 can suppress the uneven abrasion of inner jacket 8 developed at the one elongated side section 18a. Hence, as viewed from the axial direction of jacket 2 (8, 9), an allowance range of a deviation quantity between the biasing direction by means of biasing mechanism 11 and the center position of opening hole 17 can be enlarged. Thus, a design freedom of the whole steering column apparatus can be enlarged.

It should be noted that, in this second embodiment, the same action and advantages as the first embodiment can be obtained.

Third Embodiment

The steering column apparatus in a third preferred embodiment will be described using FIG. 8.

Figure 8:
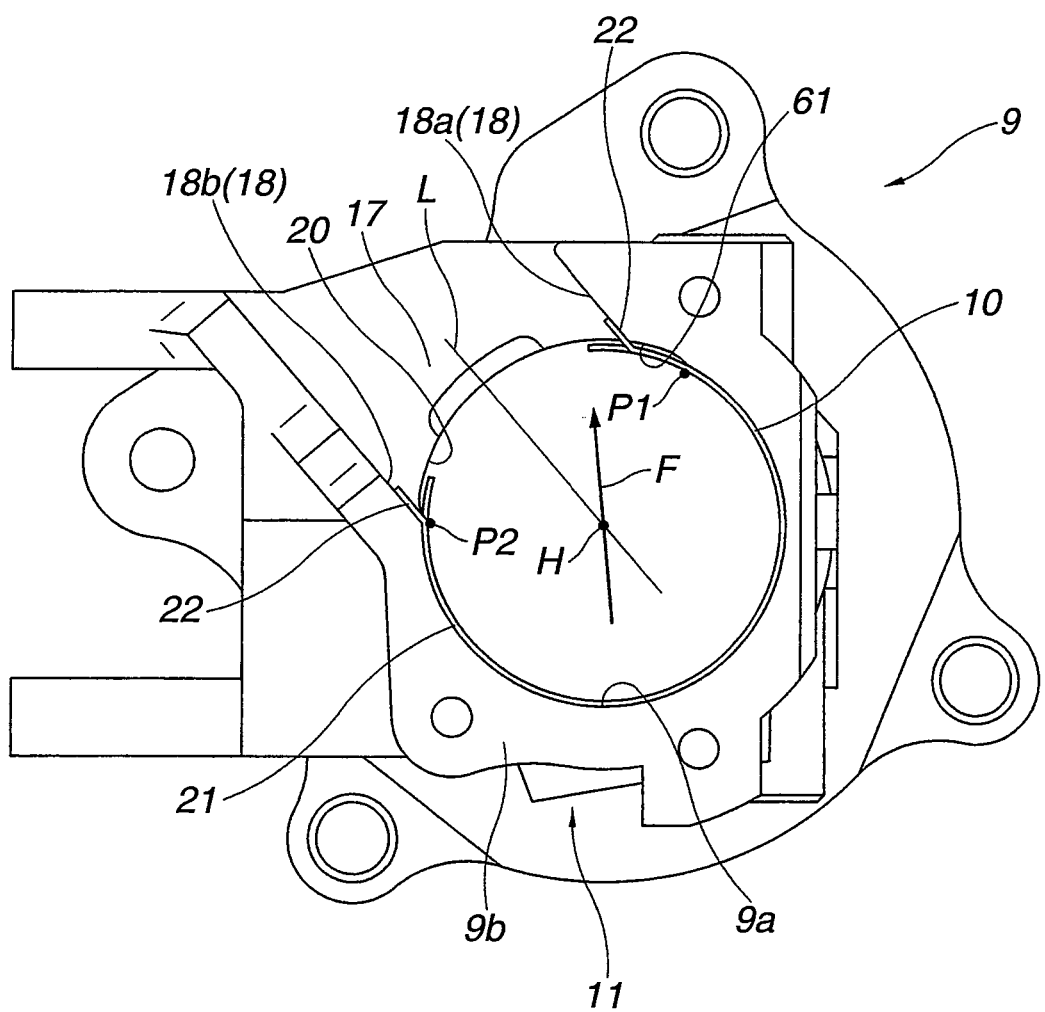
FIG. 8 is an elevation view of the outer jacket in a third preferred embodiment of the steering column apparatus according to the present invention.

FIG. 8 shows the elevation view representing a rough structure of outer jacket 9 in the third embodiment of the steering column apparatus.

The steering column apparatus in the third embodiment has substantially the same structure as the steering column apparatus in the first embodiment. However, in a case where, as viewed from the axial direction of jacket 2 (8, 9), the biasing direction (arrow mark F) by means of biasing mechanism 11 is deviated toward one elongated side section 18a with respect to the opening center (straight line L), supporting point P1 of one elongated side section 18a side is set to become remote from one elongated side section 18a from among supporting points P1, P2 supporting inner jacket 8 along pair of elongated side sections 18a, 18b of opening hole 17.

That is to say, in this third embodiment, an inner diameter of a part of inner peripheral surface 9a of outer jacket 9 adjacent to one elongated side section 18a is made relatively large to form a recess section 61 which is not contacted on the outer peripheral surface of retainer 10.

At a part of inner peripheral surface 9a of outer jacket 9 at which recess section 61 is set, it becomes possible for retainer 10 to be warped and inner jacket 8 is not supported at the part at which the recess section 61 is set. Hence, inner jacket 8 is supported at the position of inner peripheral surface 9a at which recess section 61 is not set.

In other words, since recess section 61 is set on outer jacket 9, a position (supporting point P1) on which inner jacket 8 is supported at one elongated side section 18a is more remote from opening hole 17 than a position (supporting point P2) at which inner jacket 8 is supported at the other elongated side section 18b.

Thus, even in a case where the opening center (straight line L) of opening hole 17 is not coincident with the biasing direction (arrow mark F) by means of biasing mechanism 11 as viewed from the axial direction of jacket 2 (8, 9), the uneven abrasion of inner jacket 8 at one of supporting points P1, P2 can be suppressed.

Then, according to a set modification of outer jacket 9 at the time of the casting thereof, a setting range of recess section 61 can easily be modified. Hence, it is not necessary to carry out a special machining for outer jacket 9 and the uneven abrasion of inner jacket 8 can inexpensively be suppressed.

In addition, even if the biasing direction by means of biasing mechanism 11 is deviated toward one elongated side section 18a side of opening hole 17, the uneven abrasion of inner jacket 8 developed at one elongated side section 18a can be suppressed according to the set modification of outer jacket 9 during the casting. Hence, the allowance range of the deviation quantity between the biasing direction by means of biasing mechanism 11 and the center position of opening hole 17 can be made large and the degree of freedom of design in the whole steering column apparatus can be enlarged.

It should be noted that, in the third embodiment, the same action and advantages as the first embodiment can be obtained.

Fourth Embodiment

Figure 9:
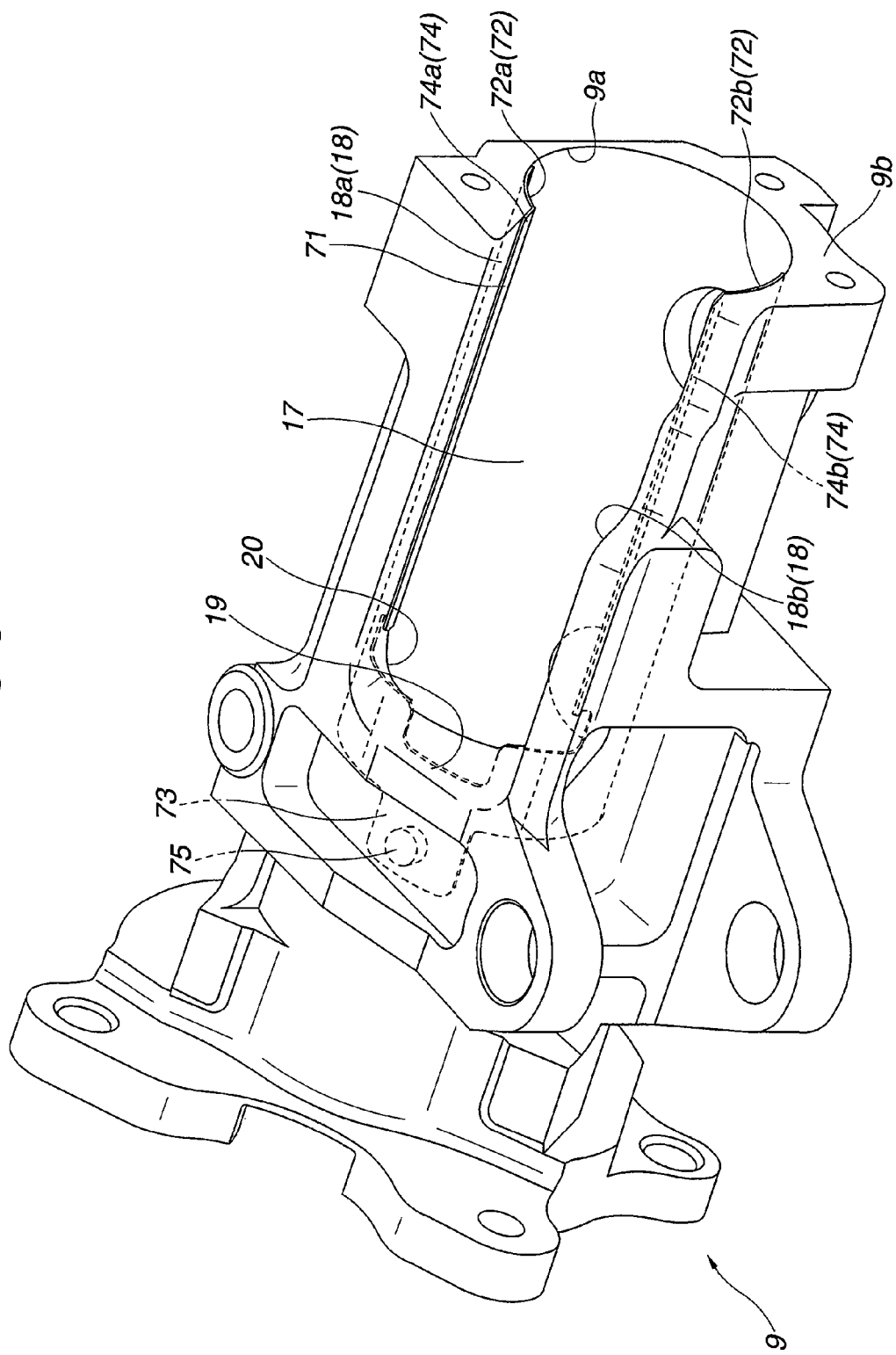
FIG. 9 is a perspective view of the outer jacket in a fourth preferred embodiment of the steering column apparatus.
Figure 10:
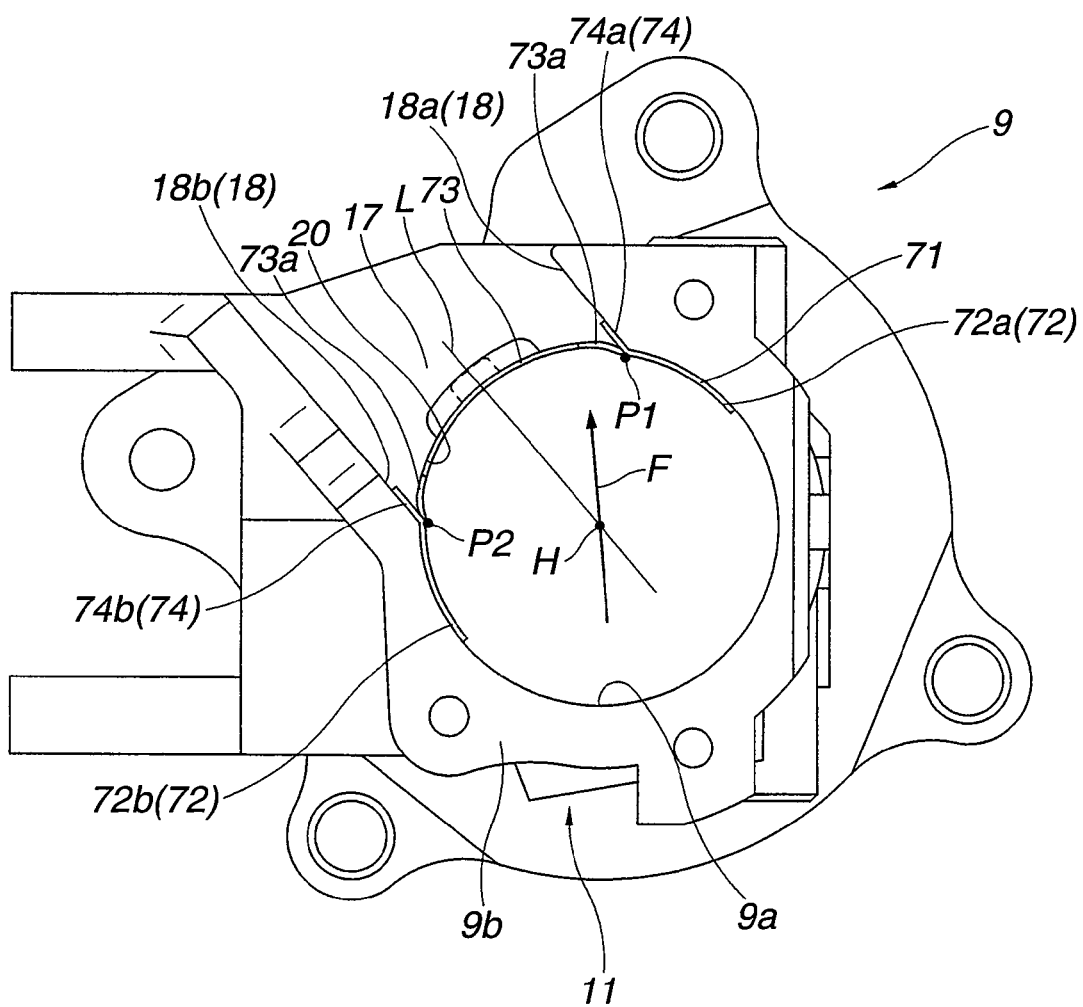
FIG. 10 is an elevation view of the outer jacket in the fourth preferred embodiment of the steering column apparatus.
Figure 11A:
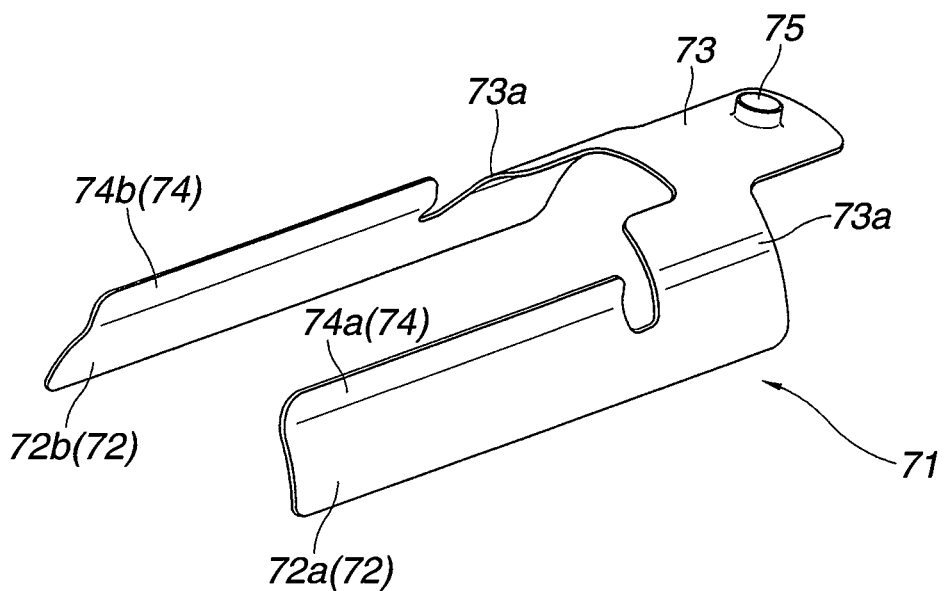
FIGS. 11A and 11B are perspective views of the retainer in the fourth embodiment of the steering column apparatus, FIG. 11A being the perspective view as viewed from one side of the retainer and FIG. 11B being the perspective view as viewed from the other side of the retainer.
Figure 11B:
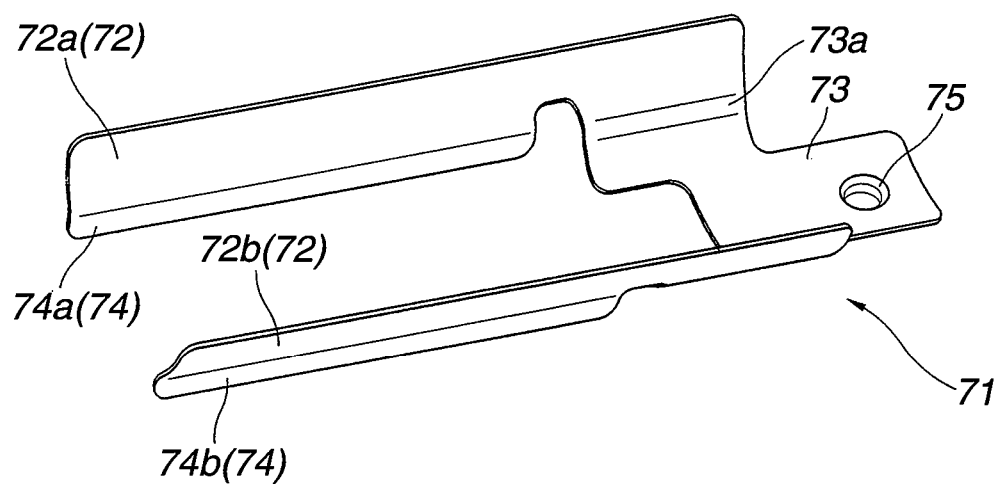

FIGS. 9 through 11 show the steering column apparatus in a fourth preferred embodiment according to the present invention. FIGS. 9 and 10 show a rough configuration of outer jacket 9 in the fourth preferred embodiment according to the present invention. FIG. 9 shows a perspective view of outer jacket 9 in the fourth embodiment and FIG. 10 shows an elevation view of outer jacket 9 in the fourth embodiment. FIGS. 11A and 11B show perspective views of a retainer 71 in the fourth embodiment.

The steering column apparatus in the fourth preferred embodiment has generally the same structure as the first preferred embodiment described above. However, as shown in FIGS. 11A and 11B, a shape of retainer 71 as the arc shaped member is different from that in the first embodiment.

Retainer 71 in the fourth embodiment is of approximately letter C shape. That is to say, retainer 71 is produced by carrying out a bending process of the steel made plate-like member of a whole substantially letter U shape. Retainer 71 includes: a pair of elongated arm sections 72a, 72b having a constant curvature; an arc shaped linkage section 73 interposed between pair of arm sections 72a, 72b having one end linking both arm sections 72a, 72b; and bent sections 74a, 74b bent from respective arm sections 72 (72a, 72b).

A length of an arc (section) of linkage section 73 is set to have approximately the same as the length of recess section 20 formed on inner peripheral surface 9a of outer jacket 9 along the circumferential direction of jacket 2 (8, 9). When retainer 71 is fitted into and fixed to inner peripheral surface 9a of outer jacket 9, linkage section 73 is positioned within recess section 20. In addition, a curvature of linkage section 73 is set to be smaller than the curvature of inner peripheral surface 9a of outer jacket 9. Accordingly, the curvature of a proximity section 73a of arm section 72 is set to link the curvature of inner peripheral surface 9a of outer jacket 9 and the curvature of recess section 20.

In addition, a projection section 75 which projects toward the outer peripheral side of linkage section 73 by means of a press working is formed on linkage section 73. An engagement recess section (not shown) corresponding to this projection section is formed on inner peripheral surface 9a of outer jacket 9 in the fourth preferred embodiment. In details, projection section 75 is engaged with outer jacket 9 to make positioning of retainer 71 in the direction of jacket 2 (8, 9).

Bending sections 74a, 74b are engaged with elongated side sections 18a, 18b of opening hole 17 and limit a relative rotation of retainer 71 and outer jacket 9

Retainer 71 in the fourth embodiment has a small contact area on inner peripheral surface 9a of outer jacket 9 as compared with retainer 10, 51 in the first, second, and third embodiments. However, by engaging projection section 75 of retainer 71 with outer jacket 9, retainer 71 can stably be held and fixed at an initial stage position.

Then, inner jacket 8 is slidably arranged on such retainer 71 as described above. It should be noted that a fluororesin-coating is carried out on the inner peripheral surface of retainer 71 to improve a slidability with respect to inner jacket 8.

The steering column apparatus in the fourth embodiment can achieve the same actions and advantages as the first embodiment.

Retainer 71 in the fourth embodiment can relatively be light-weighted since the quantity of plate material used as retainer 71 is less than the quantity of plate material used as retainer 10, 51 in the first, second, or third embodiment. Hence, the steering column apparatus in the fourth embodiment can relatively be light-weighted.

Fifth Embodiment

Figure 12:
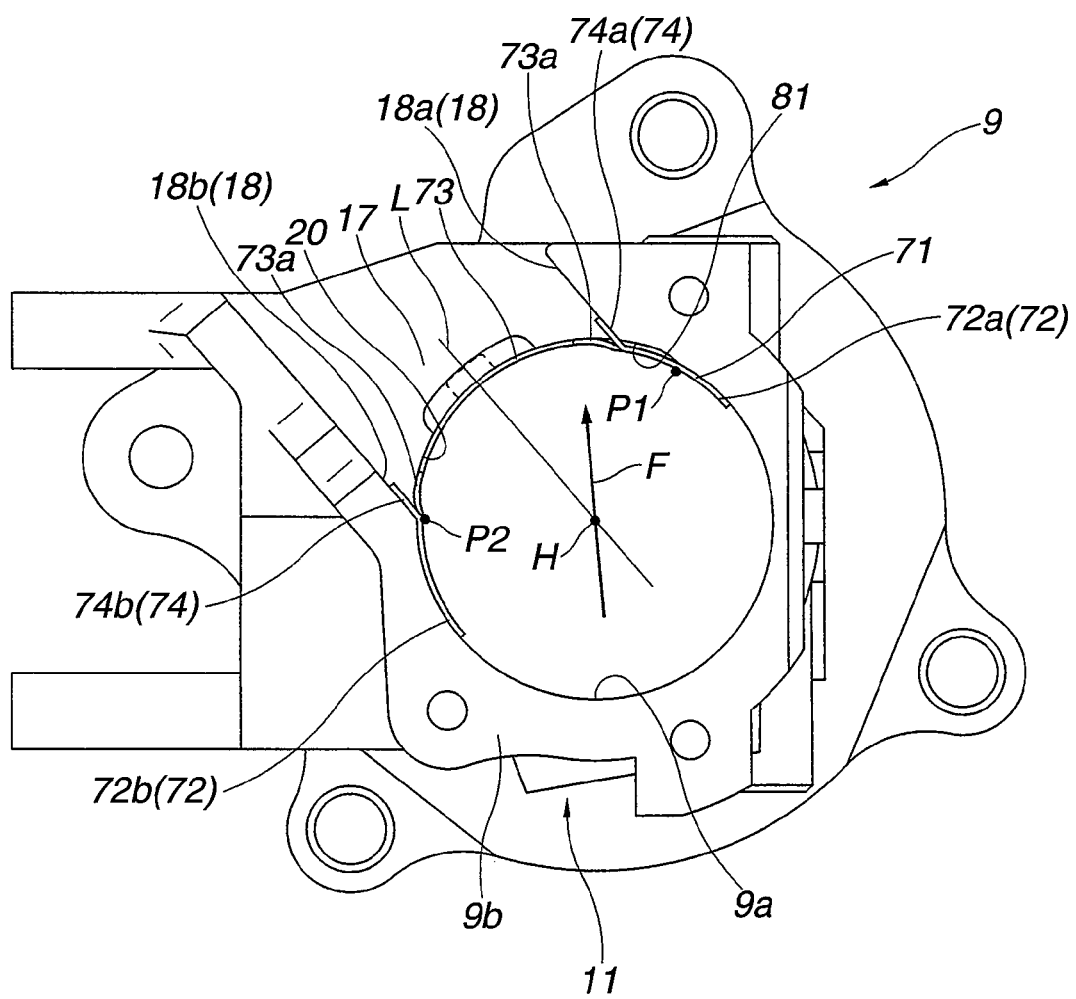
FIG. 12 is an elevation view of the outer jacket in a fifth preferred embodiment of the steering column apparatus according to the present invention.

The steering column apparatus in a fifth embodiment will be described using FIG. 12. FIG. 12 shows an elevation view representing a rough structure of outer jacket 9 in the fifth preferred embodiment according to the present invention.

The steering column apparatus in the fifth preferred embodiment is generally the same structure as the steering column apparatus in the fourth embodiment. In a case where, as viewed from the axial direction of jackets, the biasing direction (arrow mark F) by means of biasing mechanism 11 with respect to the opening center (straight line L) is deviated toward one elongated side section 18a side, supporting point P1 of one elongated side section 18a is set to be remote from one elongated side section 18a from among supporting points P1, P2 supporting inner jacket 8 along pair of elongated side sections 18a, 18b of opening hole 17.

That is to say, in the fifth embodiment, an inner diameter of a part of inner peripheral surface 9a of outer jacket 9 which is adjacent to one elongated side section 18a is made relatively large and a recess section 81 which is not contacted on the outer peripheral surface of one arm section 72a of retainer 71 is formed.

It becomes possible to warp one of arm sections 72a of retainer at a part of one elongated side section 18a at which a recess section 81 is set and inner jacket 8 is not supported. Hence, inner jacket 8 is supported at a position at which recess section 81 is not set.

That is to say, since recess section 81 is set on outer jacket 9, a position of one elongated side section 18a side at which inner jacket 8 is supported (supporting point P1) is made more remote from opening hole 17 than the position (supporting point P2) at which inner jacket 8 is supported at the other elongated side section 18b side.

The steering column apparatus in the fifth embodiment can have the same action and advantages as the fourth embodiment and the third embodiment described above.

According to the present invention, the position of the supporting unit of the telescopic adjustment mechanism along the axial direction of the jacket and the position of bias mechanism (11) along the axial direction of the jacket which is disposed at the fitting section of the jacket (2) are arranged to be coincident with each other and the supporting unit is not positioned toward the steering gear side than the outer jacket in the axial direction of the jacket so that the length along the axial direction of the jacket can relatively be shortened. Therefore, the steering column apparatus according to the present invention can relatively be small sized in the axial direction of the jacket.

In addition, in a case where, as viewed from the axial direction of the jacket, the biasing direction by means of the biasing mechanism (biasing means) is deviated toward one of the elongated side sections of the opening hole with respect to the opening center of the opening hole, the supporting point of one of the elongated side sections is set to be remote from the one elongated side section from among two supporting points supporting the inner jacket along the pair of elongated side sections of the opening hole as viewed from the axial direction of the jacket. Thus, the biasing force by means of the biasing mechanism (biasing means) is suppressed from being concentrated onto the supporting point of the one side of the elongated side sections of the opening hole. Then, the uneven abrasion of the inner jacket can be suppressed at one elongated side section side of the opening hole.

This application is based on a prior Japanese Patent Application No. 2013-112691 filed in Japan on May 29, 2013. The entire contents of this Japanese Patent Application No. 2013-112691 are hereby incorporated by reference. Although the invention has been described above by reference to certain embodiments of the invention, the invention is not limited to the embodiment described above. Modifications and variations of the embodiments described above will occur to those skilled in the art in light of the above teachings. The scope of the invention is defined with reference to the following claims.

What is claimed is:

1. A steering column apparatus, comprising:
   a jacket including a cylindrical inner jacket and a cylindrical outer jacket,
   the cylindrical inner jacket being inserted through an inside of the cylindrical outer jacket;
   an arc shaped member which is formed by bending a thin plate material, the arc shaped member being interposed between the cylindrical outer jacket and the cylindrical inner jacket;
   a steering shaft rotatably supported on the jacket, the steering shaft having one end linked to a steering wheel and the other end linked to a steerable gear side;
   a telescopic adjustment mechanism with an electrically driven motor as a driving source, the telescopic adjustment mechanism being adjustable a forward-or-backward position of the steering wheel by modifying a projection quantity of the cylindrical inner jacket projected from one end side of the cylindrical outer jacket; and
   a biasing mechanism configured to press an outer peripheral surface of the cylindrical inner jacket on an inner peripheral surface of the cylindrical outer jacket via the arc shaped member,
   wherein a rectangular opening hole having a pair of elongated side sections along an axial direction of the jacket is formed on one end side of the outer jacket, the biasing mechanism comprises a pressing member disposed along the axial direction of the outer jacket at an opposite side of a circumferential direction of the opening hole and biased to project from the inner peripheral surface of the outer jacket toward a radial direction of the outer jacket, the telescopic adjustment mechanism comprises: a supporting unit placed within the opening hole and fixed to the outer peripheral surface of the inner jacket; and an axle member movably supported on the outer jacket along the axial direction of the jacket and having a tip linked to the supporting unit, and the inner jacket is always biased toward the opening hole side by means of a biasing force of the pressing member and is supported via the arc shaped member at both side sections of the opening hole in the inner peripheral surface of the outer jacket placed along the pair of elongated side sections.

2. The steering column apparatus as claimed in claim 1, wherein the inner jacket is supported at two supporting points provided at both sides of the opening hole and placed at the pair of elongated side sections of the opening hole as viewed from the axial direction of the jacket.

3. The steering column apparatus as claimed in claim 1, wherein, in a case where, as viewed from the axial direction of the jacket, a biasing direction of the biasing mechanism is deviated toward one of the pair of elongated side sections with respect to an opening center of the opening hole, a tip position of the arc shaped member placed at the one of the pair of elongated side sections is set to be more remote from the opening hole than a tip position of the arc shaped member placed at the other of the pair of elongated side sections and a position at which the inner jacket is supported at one of the pair of the elongated side sections is more remote from the opening hole than another position at which the inner jacket is supported at the other of the pair of the elongated side sections.

4. The steering column apparatus as claimed in claim 1, in a case where, as viewed from the axial direction of the jacket, a biasing direction of the biasing mechanism is deviated toward one of the pair of elongated side sections with respect to an opening center of the opening hole, an inner diameter of a part of an inner peripheral surface of the outer jacket adjacent to the one of the pair of elongated side sections is made relatively large and a position of the one of the pair of elongated side sections at which the inner jacket is supported is more remote from the opening hole than a position of the other of the pair of elongated side sections at which the inner jacket is supported.

5. The steering column apparatus as claimed in claim 1, wherein the arc shaped member is made of steel, the outer jacket is a casting product, and the inner jacket is a cylindrical member made of steel.

* * * * *

UNITED STATES PATENT AND TRADEMARK OFFICE
CERTIFICATE OF CORRECTION

| | | |
|---|---|---|
| PATENT NO. | : 8,967,016 B2 | Page 1 of 1 |
| APPLICATION NO. | : 14/288988 | |
| DATED | : March 3, 2015 | |
| INVENTOR(S) | : Yota Uesaka | |

It is certified that error appears in the above-identified patent and that said Letters Patent is hereby corrected as shown below:

Title page

Please add the foreign priority data:

(30) Foreign Application Priority Data
May 29, 2013 (JP)................. 2013-112691

Signed and Sealed this
First Day of March, 2016

Michelle K. Lee
*Director of the United States Patent and Trademark Office*